April 26, 1932.    R. E. GILLESPIE    1,855,287
ADVERTISING APPARATUS
Filed Jan. 21, 1930    4 Sheets-Sheet 1
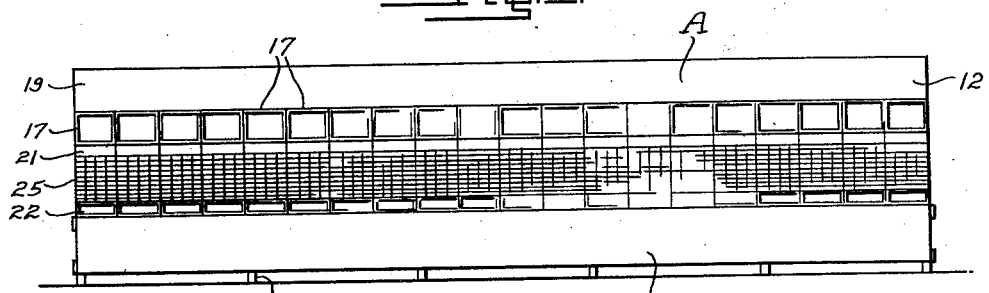
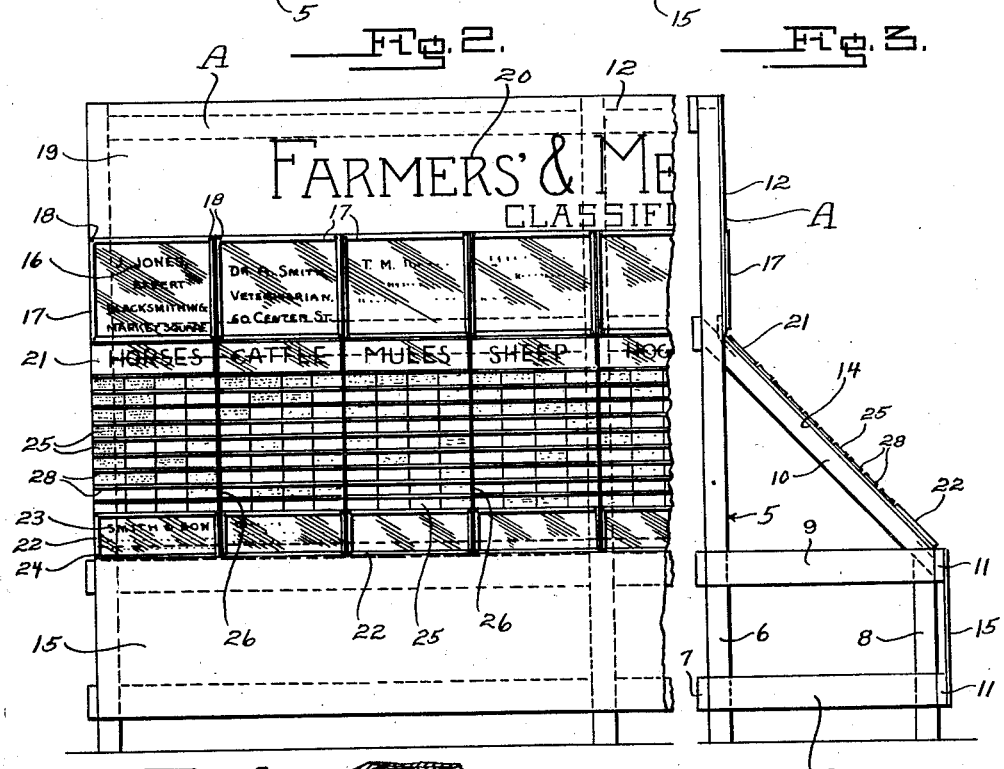
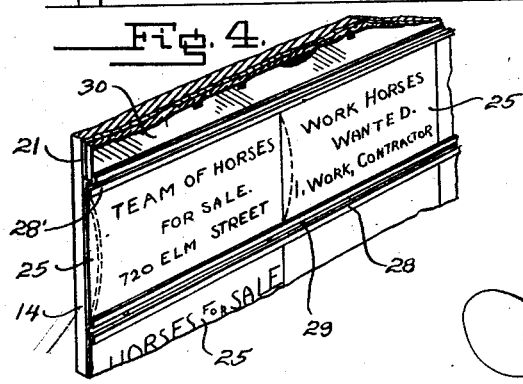
INVENTOR.
Robert E. Gillespie
BY
ATTORNEYS.

April 26, 1932.    R. E. GILLESPIE    1,855,287
ADVERTISING APPARATUS
Filed Jan. 21, 1930    4 Sheets-Sheet 2
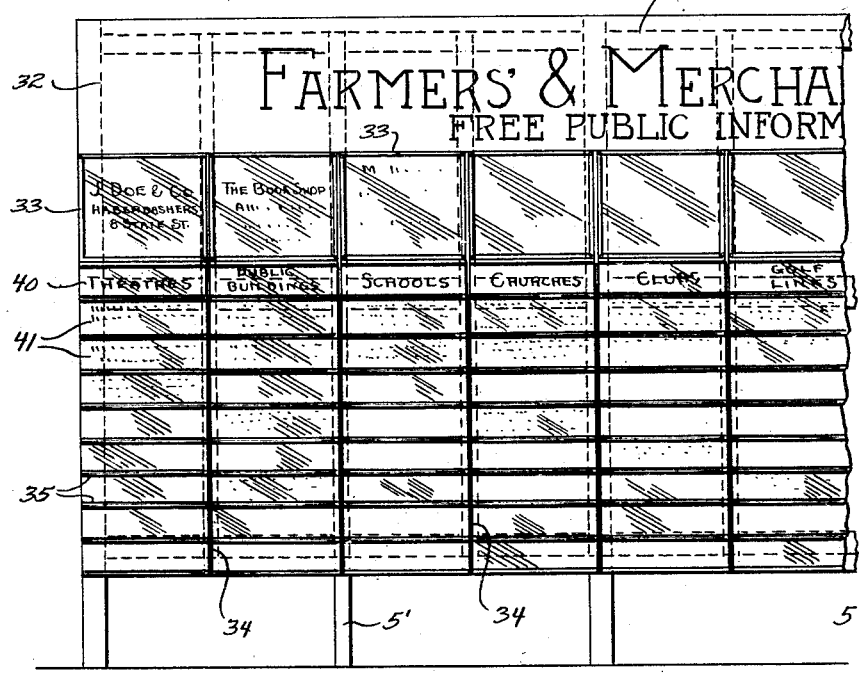
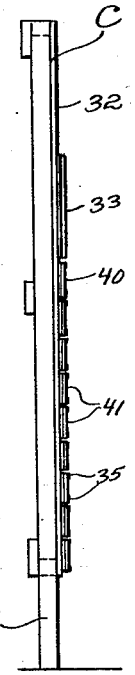
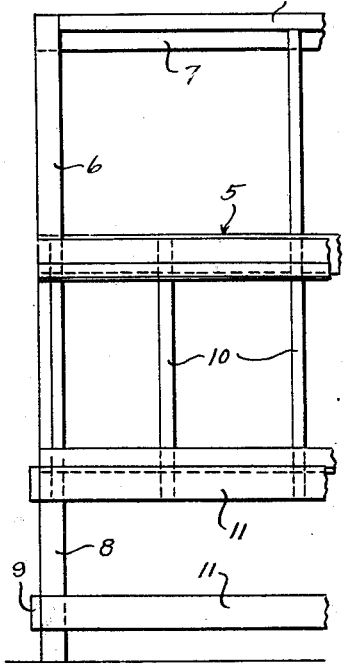
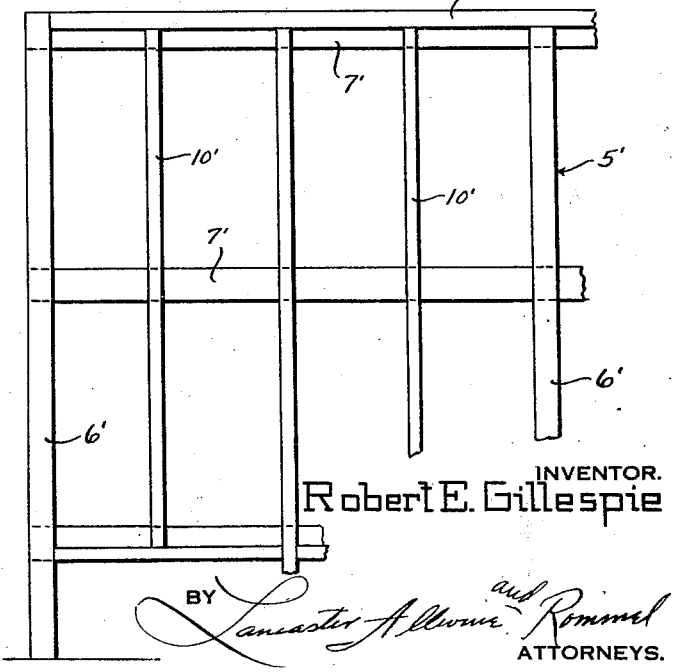
INVENTOR.
Robert E. Gillespie
ATTORNEYS.

April 26, 1932. R. E. GILLESPIE 1,855,287
ADVERTISING APPARATUS
Filed Jan. 21, 1930 4 Sheets-Sheet 3
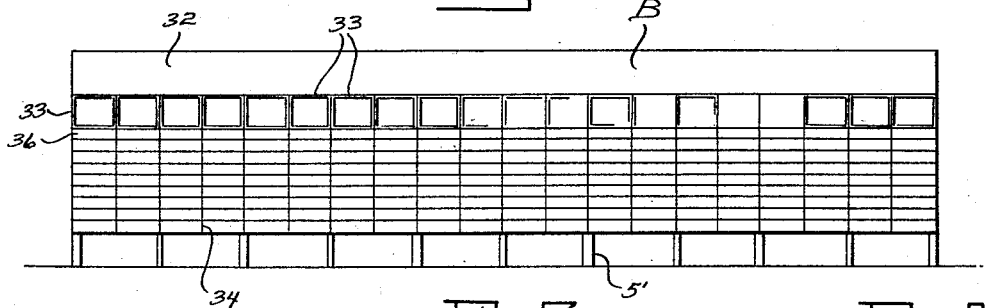
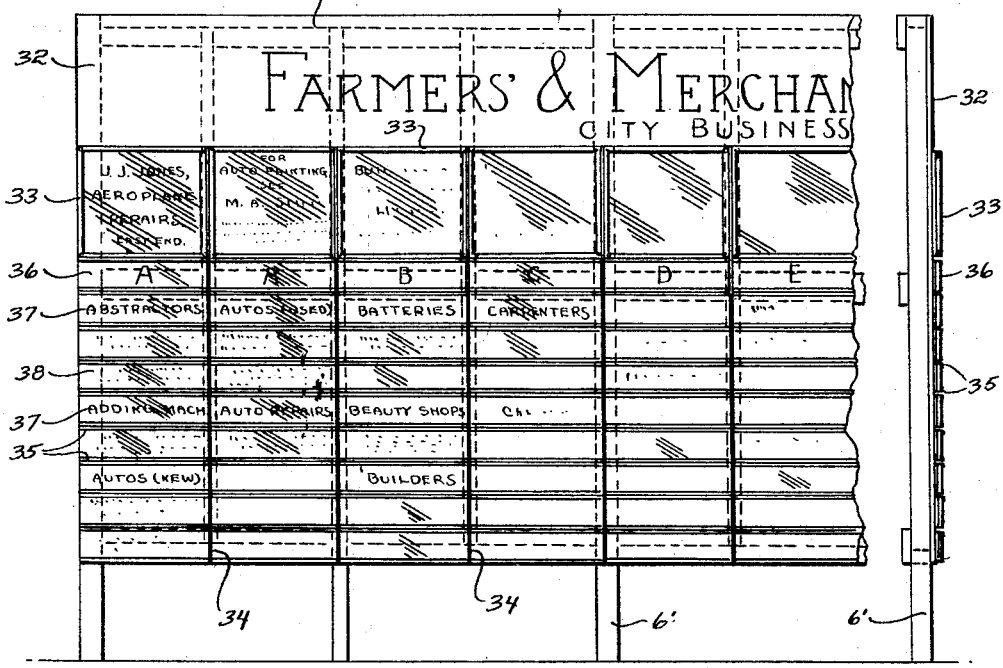
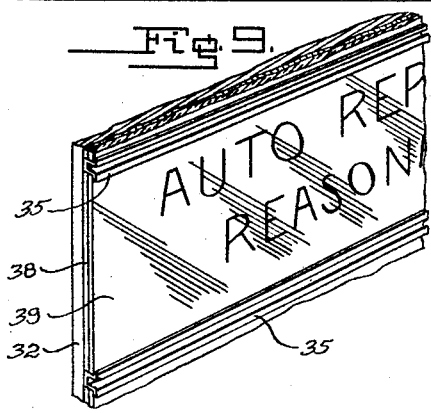
INVENTOR.
Robert E. Gillespie
BY Lancaster Allwine and Rommel
ATTORNEYS.

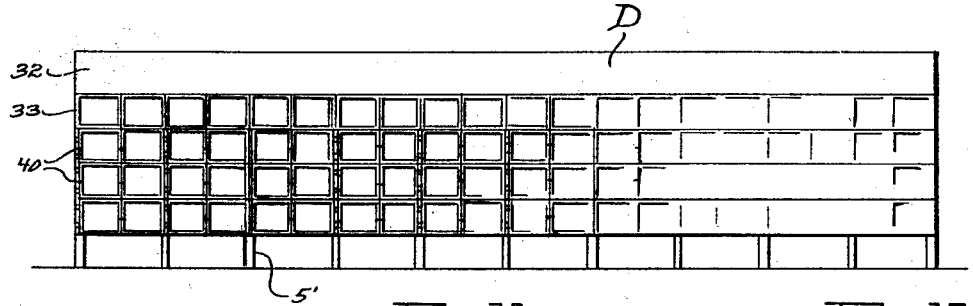
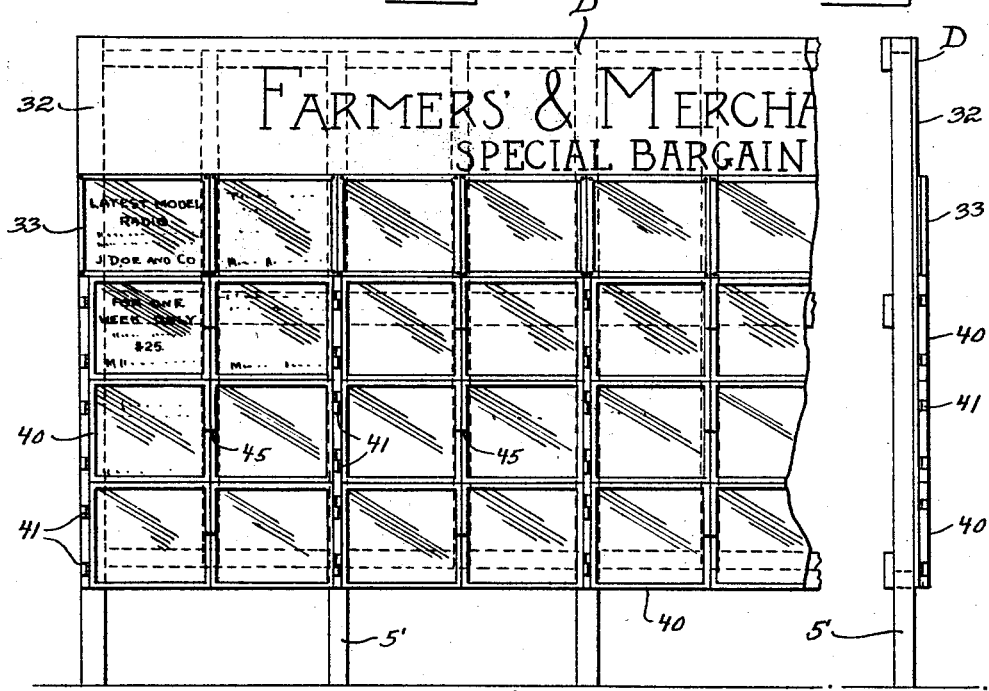
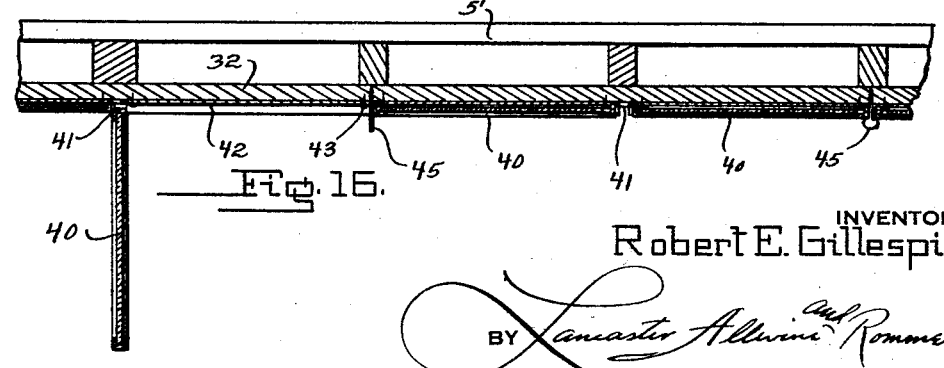

Patented Apr. 26, 1932

1,855,287

UNITED STATES PATENT OFFICE

ROBERT E. GILLESPIE, OF SPRINGFIELD, MISSOURI

ADVERTISING APPARATUS

Application filed January 21, 1930. Serial No. 422,430.

The present invention relates to advertising apparatus and the primary object of the invention is to provide improved apparatus of this character embodying units having display areas for displaying all necessary advertising and information in an attractive manner relative to the community, building or other location where the apparatus is to be used.

A further object of the invention is to provide advertising apparatus whereby advertising and other desired data for public information may be centralized and one wherein the cost of advertising will be greatly reduced.

A further object of the invention resides in the provision of improved advertising apparatus embodying units for the display of information and advertising in an orderly and attractive manner whereby the public can quickly and easily obtain the desired information.

A further object of the invention is to provide a novel advertising unit wherein the advertising is grouped in an attractive manner about other information upon the unit so as to attract the attention of persons reading the different features of interest or other information placed upon the units.

A still further object resides in the novel manner in which a great number of advertising spaces of various sizes may be neatly arranged in a compact form upon the unit.

A still further object resides in the provision of an advertising unit which will be neat in appearance and one permitting ready and easy renewing of the advertising matter.

Other objects and advantages of the invention will be apparent during the course of the following detailed description, taken in connection with the accompanying drawings forming a part of this specification and in which drawings:

Figure 1 is a front elevation of one of the advertising units designed primarily for the advertising of farm products, live stock, poultry etc.

Figure 2 is an enlarged front elevation of one end of the unit shown in Figure 1 and showing more clearly the arrangement of the advertising and information cards.

Figure 3 is an end elevation of the unit.

Figure 4 is a fragmentary perspective view showing the manner in which the advertising cards are held in position between horizontal holders.

Figure 5 is a fragmentary detail view of one end of the supporting frame.

Figure 6 is a front elevation of one of the units intended for use as a combined advertising unit and business directory.

Figure 7 is an enlarged fragmentary front elevation of the unit shown in Figure 6.

Figure 8 is an end view of the unit shown in Figure 6.

Figure 9 is a fragmentary perspective view showing the manner in which the minor advertising cards are held in position on the unit shown in Figure 7.

Figure 10 is a fragmentary view of the supporting frame of the unit shown in Figure 6.

Figure 11 is a fragmentary front plan view of one end of the unit intended for advertising and free public information.

Figure 12 is an end elevation of the unit shown in Figure 11.

Figure 13 is a front elevation of the fourth unit primarily intended for use in the displaying of advertisements relating to special sales.

Figure 14 is an enlarged fragmentary front elevation of the unit shown in Figure 13, having the hinged frames for the individual ads to permit easy and quick changing of the ads.

Figure 15 is an end view of the unit shown in Figure 14.

Figure 16 is an enlarged fragmentary horizontal section thru the unit in Figure 13 and showing one of the hinged doors swung open for changing of the placard.

In use of the improved advertising apparatus, the four units as shown in Figures 1, 6, 11 and 13 are preferably grouped together at a centrally located point in the community in which the device is to be used and where the same will be most conveniently reached by the public. The units may however, be used singly at different locations both appropriate to the specific kind of advertising and information to be displayed by the particular unit. While each of the different units are slightly modified for better display of the particular kind of advertising and information to be displayed by each individual unit it will be observed that the same major advertising features are the like in each unit. The data is displayed on the unit in a manner to permit persons to quickly locate the desired articles and also obtain other helpful information such as may be needed in the particular locality in which the apparatus is installed.

Referring first to the form of advertising unit A shown in Figures 1 to 5 inclusive, this unit is primarily intended for the exclusive advertising of farm products, live stock, etc., in an attractive and orderly manner so that the public can quickly locate any desired ad., and at a minimum advertising cost to the person submitting the ad.

The unit A embodies a supporting frame 5 of special formation for better display of the advertiseing matter so that the same may be easily read. The frame embodies the main supporting uprights 6 connected by a suitable number of horizontal rails 7. Arranged forwardly of the main uprights 6 are minor uprights or legs 8 which are considerably shorter than the main uprights 6 and are connected in spaced relation by the ties 9. Extending upwardly and rearwardly at an angle of preferably 45° from the top of each leg 8 to the main uprights 6, and at suitable spaced points between the uprights, are the inclined supporting rails 10. The legs 8 may be connected along their front edges by the horizontal rails 11 and the uppermost rail 11 may serve to support the lower end of the inclined rails 10 which are disposed between the uprights 6. The upper end of the intermediate inclined rail 10 may be connected to one of the horizontal rails 7 disposed at a location substantially midway between the upper tie and upper end of the upright 6.

Secured in any preferred manner to the face side of the frame over the uprights 6 above the upper ends of the inclined supporting rails 10 is a flat base or backing panel 12 which may either be metal, wood or wall board of any description defining an upper display space or area. Secured in any preferred manner to the upper sides of the inclined supporting rails 10 is a flat base or backing panel 14 and which may either be of wood, metal or a suitable wall board. The panel 14 provides a lower inclined display space or area extending from the lower edge of the panel 12 to the forward edge of the frame above the front uprights 8. Secured over the face side of the rails 11 is a suitable covering panel 15 which is intended to conceal the lower portion of the supporting frame and present a neat and finished appearance to the lower portion of the advertising unit. By observing Figure 1 it will be seen that the backing panels 12 and 14 extend thruout the entire length of the frame and likewise does the covering panel 15.

The lower portion of the upper panel 12 serves to display a number of major display advertisements pertinent to the intended use of the unit and these major advertisements 16 are each disposed in separate frames 17 each of which is provided with a transparent panel such as glass for covering and protecting the display advertisements. These major display advertisements are more or less permanent ads and the frames 17 are each independently secured to the backing panel 12 by suitable screws or other fastening elements 18. The frames 17 are secured in side by side relation thruout the length of the panel and form a major display advertising space thruout the length of the unit along the lower portion of the backing panel 12. The area or field 19 formed above the row of frames 17 may be used for any suitable purpose and preferably bears the indicia 20 which may disclose the owners or agents having the advertising units and other information relative to the character of advertising displayed by the units such as "Classified local wants and offers".

Arranged along the upper portion of the inclined backing panel 14 is a series of heading cards 21 indicative of the type of advertisements disposed below the heading cards. These heading cards 21 are disposed one beneath each of the major display advertising frames 17 and are removably secured in position in a manner to be subsequently set forth. Arranged in a horizontal row along the lower edge of the inclined backing panel 14 is a series of minor display advertising frames 22 for containing minor display advertisements 23. These frames 22 are of less size than the major display frames 17 and each may be provided with a transparent protecting panel for the advertisements displayed by each frame. The frames are of a length equal to the length of the heading cards 21 and are in direct vertical alignment beneath the heading cards and since the advertisements 23 are more or less permanent, the frames 22 are preferably secured to the backing panel by means of screws or other suitable fastening elements 24. These minor display advertising frames 22 as will be observed in Figure 1 extend thruout the entire length of the unit with one of the frames arranged in vertical alignment beneath each of the major display advertising frames 17.

The heading cards 21 serve to classify a series of minor or classified advertising cards 25 and these cards 25 preferably have the information typewritten thereon for reducing the cost of advertising. Delineated in any preferred manner upon the backing panel 14 is a series of heavy division lines 26 which extend vertically at the ends of the heading cards 21 to divide the backing panel into a series of advertising columns. These heavy division lines 26 separate the different subjects under the headings of the cards 21 and thus a person desiring to read ads of any particular character may quickly do so by observing the information upon the heading cards 21. Thus it will be seen that the space on the inclined backing panel 14, between the major display advertisements 16 and minor display advertisements 23, serves as a classified advertising space whereby the desired ads may be readily found. It may here be well to state that the angular disposition of the backing panel 14 is to enable ready and easy reading of the typewitten minor advertising cards 25. A person reading any of the cards 25 will naturally have his attention directed to the large display advertisement disposed above and below the advertising cards.

The small advertising cards 25 are intended to be easily replaced and are removably held in position by means of a series of horizontal retaining rails 28 which extend in a horizontal position along the inclined backing panel. These retaining rails 28 are of substantially U-formation having outturned edges along their side flanges forming shallow channels into which the upper and lower edges of the cards 25 are positioned in end abutting relation. The retaining rails 28 extend between the vertical division lines 26 and may be secured to the backing panel 14 in any preferred manner and in the example shown have been secured to the panel by means of fastening elements 29 extended thru the web portion of the rails. In Figure 4, has been shown in dotted lines the manner in which the cardboard cards 25 may be flexed for placing the cards between a pair of the retaining rails 28.

The heading cards 21 are preferably protected by a glass or other transparent panel 30, and for this reason the upper retaining rail 28' of each column containing the cards 25 has its upper flange of slightly greater length as shown in Figure 4 for receiving the lower edges of the heading cards and transparent panels. Since the small advertising cards 25 are intended to be changed frequently, it is preferred that no protecting panel be disposed over these cards so that the cards may be easily placed and removed.

Referring now to the unit B shown in Figures 6 to 10 inclusive, this unit is intended to be used in conjunction with the unit A to serve as a combined business directory and advertising unit. The unit B primarily serves as a city business directory listing various businesses in the city under alphabetical headings.

The unit B embodies a supporting frame 5' embodying a series of uprights 6' connected at suitable spaced points by the horizontal rails 7'. Additional stiffening rails 10' may be disposed vertically between the uprights 6 to form a mounting for the backing panel 32.

Secured in horizontal alignment and in end abutting relation upon the panel 32 at a location spaced below the upper edge of the panel, is a series of display advertising frames 33 each of which is intended to contain a display advertisement having a protecting transparent panel such as glass or the like arranged over the advertisements. The advertisements will be more or less permanent and the frames may be secured as by screws or other suitable fastening elements to the panel 32. The space above the row of horizontal frames 33 may serve to contain the name of the owners of the advertising system and may also bear the indicia "City business directory".

The space on the panel below the horizontal row of frames 33 is intended for listing the different businesses in the city and is divided into columns by a series of vertical markings 34 preferably in the form of heavy lines or stripes delineated on the panel 32 in vertical alignment directly beneath the abutting side edges of the frames 33. Each column defined by the division markings 34 is provided with a series of horizontally arranged retaining rails 35 for removably receiving suitable cards arranged to alphabetically list the different lines of business and those engaged in such line of business. The uppermost companion pair of retaining rails 35 preferably receive alphabet letter cards 36 under which suitable title cards 37 may be arranged listing different kinds of business, and between which title cards the advertising cards 38 are arranged showing the firms engaged in the particular line of business designated by the title cards 37.

The retaining rails 35 are of channel-like formation having outturned portions along the edges of their side flanges providing pockets for receiving the upper and lower edges of the cards and also the edges of transparent panels 39 one of which is arranged over each of the cards 36, 37 and 38.

Referring now to the unit C shown in Figures 11 and 12, this unit in construction is similar to the unit B and is intended for use in giving free public information such as locations of places of interests, buildings and other information of general interest to the public. In the unit C, the space on the backing panel 32 above the horizontal row of advertising frames 33 preferably bears the indicia "Free public information" together with the name of the owners of the advertising unit. Since the unit C is intended for free public information, the heading cards 40 bear indicia relative to places of public interest, while the cards 41 will serve to give such information as name and location of the places designated by the heading cards 40. Thus the unit C will furnish a public service by listing in classified order places of public interest etc. The backing panel is provided with the column markings 34 and the cards 40 and 41 are held in position by the retaining rails 35. A transparent protecting panel of glass or the like is provided for the display advertisements in the frames 33 and also for the cards 40 and 41 since these ads and cards will be more or less permanent and will not require frequent changing.

Referring now to the unit D shown in Figures 13 to 16 inclusive, this unit is primarily intended for displaying special and short time advertisements such as special bargain sales and public sales advertising, where frequent and easy changing of the ad is desirable. The unit D with the exception of the means for displaying short time advertisements is similar to the unit B and like reference characters have been applied to corresponding portions of the units. In the unit D however, the space on the panel 32 above the horizontal row of permanent display advertising frames 33 preferably bears the indicia "Special bargain sales" or other similar data together with the name of the owners of the units.

Arranged in vertical rows beneath each display advertising frame 33 is a series of glazed frames 40 which are hingedly connected along one vertical edge to the panel 32 by means of suitable hinges 41 so that the frames may be readily swung open to permit of the advertising cards 42 being secured to the panel 32 as by thumb tacks or the like 43 as shown in Figure 16.

The frames 40 are of uniform size and are so compactly arranged as to utilize a maximum amount of space on the panel 32 for display of the advertisements 42. The frames 40 are arranged in pairs, that is, the hinged edge of one vertical row of frames is adjacent the hinged edge of the adjacent vertical row of frames with the hinges offset one above the other as shown in Figure 14 so that little or no space is required for hinging of the frames. The free edges of the frames move into substantially abutting relation and the frames are retained closed by means of a wing screw 45 which may be threaded into the panel 32 between the free edges of each pair of frames. As shown in Figure 16, the flat heads of the wing screws 45 when turned into a vertical position will permit ready opening and closing of the hinged frames 40 and that when the head is turned to a horizontal position it will engage the free edges of adjacent frames to retain the frames in a closed position over the advertising cards 42. Thus it will be seen that the hinged frame arrangement will permit of ready and easy changing of the advertising cards 43 which are primarily intended for special sales of short duration.

In each of the four units A, B, C and D forming the complete advertising apparatus it will be seen that the same general idea of displaying the advertisements is carried out with such information on each unit as to enable a person to readily select the proper unit from which the desired information may be obtained. The advertising apparatus is intended to centralize various kinds of advertising and other information desired by the public in different communities and when the four units are grouped together in any preferred arrangement, the advertising and other information will be displayed in an orderly and attractive manner so that the public can quickly obtain the desired information and at the same time observe the numerous advertisements.

From the foregoing description it will be apparent that a novel and improved advertising apparatus and system has been disclosed whereby the grouping of different lines of advertising with other features of general interest to the public will provide an advertising means which will be very low in cost to the advertisers and at the same time appeal to the public. It will further be apparent that a novel advertising apparatus has been disclosed for the display of information and advertising in an orderly and attractive manner on a plurality of units so grouped and designated as to the indicia designated thereon as to enable the public to quickly obtain the desired information thru knowing the exact location on any of the units where the desired information may be found.

Changes in detail may be made to the form of invention herein shown and described, without departing from the spirit of the invention or the scope of the following claims.

I claim:

1. An advertising apparatus including a backing panel, a series of relatively large advertising frames arranged in side edge abutting relation thruout the length of the panel, means for independently securing each frame to the panel to form a row of frames spaced below the top edge of the panel, said panel having heavy division lines delineated thereon in alignment beneath the abutting side edges of each frame and extending to the bottom of the panel and forming columns beneath each frame, and a series of placards removably secured to the panel in each of said columns.

2. An advertising apparatus including a backing panel, a series of relatively large advertisement receiving frames arranged in side edge abutting relation thruout the length of the panel in spaced relation below the top edge of the panel, means for independently securing each frame to the panel, said panel having a series of division lines delineated thereon beneath the horizontal row of frames in alignment with the abutting side edges of the frames, a series of retaining rails arranged in a horizontal position between the division lines in the line of vision of a person viewing the apparatus, and placards removably supported between adjacent pairs of rails.

3. An advertising apparatus including a backing panel, a series of relatively large advertisement receiving frames arranged in side edge abutting relation thruout the length of the panel in spaced relation below the top edge of the panel, means for independently securing each frame to the panel, said panel having a series of division lines delineated thereon beneath the horizontal row of frames in alignment with the abutting side edges of the frames, a series of retaining rails arranged in a horizontal position between the division lines with the uppermost pair of each series spaced apart a greater distance than the spacing of the other rails, heading cards removably supported between the uppermost rails of each column formed by the division lines, and placards removably supported between the rails beneath the heading cards.

4. An advertising apparatus comprising a supporting frame, a vertically disposed backing panel supported on the upper portion of the frame, an inclined backing panel supported on the frame below the vertical backing panel in the normal line of vision of a person viewing the apparatus, a series of independently removable major display advertising frames arranged in edge abutting relation along the lower portion of the vertical backing panel, a series of horizontally disposed retaining rails arranged on the inclined backing panel beneath each of said frames, small placards removably supported between adjacent pairs of the rails, and a series of minor display advertising frames independently secured along the lower edge of the inclined backing panel.

5. An advertising apparatus comprising a supporting frame, a vertical backing supported upon the upper portion of the frame, an inclined backing panel supported on the frame directly beneath the lower edge of the vertical backing panel, a series of independently detachable major display advertisement frames of like shape and size arranged in side edge abutting relation along the lower edge of the vertical backing panel, said inclined backing panel having delineated thereon division lines in vertical alignment with the abutting side edges of said frames, a series of horizontally disposed retaining rails secured to the inclined panel between the division lines, heading cards arranged between the uppermost pair of rails between each pair of division lines, relatively small classified advertising cards removably supported between the rails under each heading card, and a series of minor display advertising frames arranged along the lower edge of the inclined panel and each being independently removable from the panel.

6. An advertising apparatus comprising a frame including vertical uprights and inclined supporting rails, a vertical backing panel supported on the vertical uprights above the upper end of the inclined supporting rails, an inclined backing panel supported on the inclined supporting rails in the normal line of vision of a person viewing the apparatus, a series of independently detachable frames secured in a horizontal row along the lower edge of the vertical backing panel, said inclined backing panel having delineated thereon a series of division lines forming an advertising column beneath each frame, a series of horizontally arranged retaining rails secured to the inclined panel in each column, a large heading card for each column and each having a transparent protecting panel, a series of relatively small advertising cards removably supported between the retaining rails of each column, and an advertisement receiving frame secured to the inclined panel at the lower end of each column.

7. An advertising apparatus including a backing panel, a series of relatively large advertising frames arranged in side edge abutting relation thruout the length of the panel, means for independently securing each frame to the panel to form a row of frames spaced below the top edge of the panel, means displaying a division line in alignment with each of the abutting side edges of each frame and forming columns beneath each frame, and a series of placards removably secured to the panel in each of said columns.

ROBERT E. GILLESPIE.